Patented Jan. 28, 1947

2,414,950

UNITED STATES PATENT OFFICE 2,414,950

CONVERSION OF BIGUANIDE SALTS

Joseph R. Ingram, Nitro, W. Va., assignor to Monsanto Chemical Company, St. Louis, Mo., a corporation of Delaware No Drawing. Application April 14, 1943, Serial No. 483,059

5 Claims. (Cl. 260—564)

The present invention relates to the preparation of a free biguanide and more particularly to the conversion of biguanide salts to free biguanides.

In the usual method of preparation the biguanide is first obtained in the form of a salt and must be liberated from the salt forming constituent if the free biguanide is desired. Thus, biguanides are conveniently prepared by reacting dicyandiamide with a suitable amine in acid solution whereby the acid salt of the corresponding biguanide is formed. Neutralization of the salt to form the free biguanide is a slow process requiring care and constant supervision in spite of the fact that it is simply a matter of reacting an acid with a base. Heretofore very efficient stirring for long periods of time has been absolutely essential.

It is an object of this invention to provide an improved process for converting salts of biguanides to free biguanides. A further object is to obtain a pure biguanide substantially free from the salt and other impurities. A further specific object is to speed up the reaction cycle for the preparation of free biguanides. Still another object is to simplify the neutralization of a biguanide salt. Other and further objects will be apparent from the detailed description following.

It has been found that a biguanide salt is not readily penetrated by alkali and that this is the source of much of the difficulty heretofore encountered. Especially in aqueous medium in which most biguanides are insoluble the partially neutralized product is a pasty mass which occludes some of the biguanide salt and renders penetration by the alkali even more difficult. While efficient stirring is necessary, on the other hand it increases the efficiency of the dissemination of the free biguanide through the partially neutralized mass and hence fails to mitigate against occlusion. However, in accordance with the present invention it has been discovered that the presence of a wetting agent during neutralization brings about immediate penetration by the alkali, prevents occlusion and markedly shortens the time required to liberate the free biguanide. For best results the reaction should be carried out at a temperature of at least 50° C. At lower temperatures the reaction time is materially extended; while neutralization at room temperature is possible and is shortened and otherwise facilitated by the presence of a wetting agent, it is nevertheless a slow process. Furthermore, the reaction can be carried out just as well at temperatures above 50° C. but the advantage, if any, is slight. In the presence of a wetting agent the time of the reaction cycle decreases only slowly as the temperature is increased above 50° C. In addition, 100° C. is about the upper working limit since some biguanides begin to decompose about this temperature.

Any good wetting agent can be used. Wetting agents suitable for use in the present invention comprise the following but the invention is by no means limited thereto: Alkylated aromatic sodium sulfonates, as for example alkyl benzene sodium sulfonate and alkyl naphthalene sodium sulfonate, the alkali metal salts of dialkyl esters of sulfosuccinic acid, the alkali metal salts of higher secondary alkyl sulfates, sulfonated and sulfated ethers, the product of the structure $C_{17}H_{35}CONHC_2H_4SO_3Na$ which is known under the name Igepon T, sodium sulfate of lauryl alcohol, alkyl phenol sodium sulfonate, sulfonated pine oil, sulfonated petroleum oil, sulfonated vegetable oil and other sulfonated products. A large number of wetting agents are available commercially under a variety of trade names and can be used in the present invention with varying degrees of efficiency. More efficient wetting properties are reflected in the present instance by complete neutralization in a shorter time.

The present process can be used with advantage for the neutralization of any biguanide salt. Naturally, the advantage is greatest with the salts of biguanides most difficult to neutralize, namely biguanides containing large organic substituents. The salt forming constituent is not critical but the cheaper acids are of course used commercially and are the most important. Typical examples of biguanide salts which may be reacted according to the present invention comprise the sulfates, hydrochlorides and nitrates of mono-o-tolyl biguanide, mono-p-tolyl biguanide, alpha diphenyl biguanide, mono-o-anisyl biguanide, mono-p-phenetidyl biguanide, mono-xylyl biguanide, mono-o-biphenyl biguanide, mono phenyl biguanide and the like. These are of course only illustrative of the invention and are not to be taken as limitative thereof. Likewise the specific examples below are illustrative of the invention and not limitative thereof.

Into a glass or glass lined vessel of suitable capacity fitted with a reflux condenser and agitator there was charged substantially 13.5 pounds of water and 7.5 pounds of 24.5% hydrochloric acid. To this was added with stirring substantially 8.5 pounds of molten ortho amino biphenyl and the stirring continued for about an hour. Substantially 4.2 pounds of dicyandiamide was then added and the temperature raised slowly. At about 82° C. a vigorous reaction set in which was controlled by external cooling. The reaction mixture was kept at refluxing temperature for about an hour and then allowed to cool. When the temperature reached approximately 80° C. 20 pounds of water was added and the batch poured with vigorous agitation into a mixture of 9 pounds of 25% caustic soda and 40 pounds of water. Substantially one pound of an approximately 30% solution of decyl benzene sodium sulfonate was added and the temperature raised to 50° C. Stirring and heating at 50–60° C. was continued until neutralization was complete. On the average from 6 to 8 hours were required for neutralization.

Since the free biguanide is soluble in alcohol whereas the hydrochloride salt is virtually insoluble, a convenient means of following the reaction is to determine the percentage of alcohol insoluble material in a sample of the reaction liquor. When substantially no alcohol insoluble material remains, the reaction is complete. The data given below are from a series of runs carried out as described above and show that the presence of a wetting agent markedly speeds up the reaction cycle.

*Table I*

| Wetting agent | Conc. based on total water | Hours digested | Per cent alcohol insoluble |
|---|---|---|---|
| | Per cent | | |
| None | | 8 | 12.0 |
| Do | | 20 | 3.3 |
| Do | | 24 | .4 |
| Decyl benzene sodium sulfonate | 0.35 | 4 | 4.1 |
| | .35 | 8 | .0 |
| | .18 | 12 | 10.0 |
| Do | .18 | 20 | .0 |
| Butyl diphenyl sodium sulfonate | .35 | 12 | .1 |

The above data show that in the absence of a wetting agent some alcohol insolubles remain even after 24 hours digestion whereas when the digestion is carried out in a 0.35% solution of decyl benzene sodium sulfonate no alcohol insolubles remain after 8 hours digestion. As little as 0.18% wetting agent shows a benefit but this is below the optimum concentration.

In another series of runs 40 parts by weight of the hydrochloric acid salt of o-biphenyl biguanide was digested with substantially 120 parts by weight of 5% caustic soda under various conditions. It will be noted that the concentration of the salt in the aqueous medium is about twice what it was in the preparations described above. The results are summarized below:

*Table II*

| Wetting agent | Conc. based on total water | Temp. | Hours digested | Percent alcohol insoluble |
|---|---|---|---|---|
| | | Degrees | | |
| None | | 25 | 7 | 65 |
| Do | | 50 | 20 | 28 to 60 |
| Decyl benzene sodium sulfonate | 0.43 | 50 | 23 | Trace |
| Butyl diphenyl sodium sulfonate | .43 | 50 | 23 | 0.4 |

The above data show that neutralization of a concentrated solution of a biguanide salt at 50° C. is next to impossible being as little as 40% complete after 20 hours digestion but in the presence of a wetting agent the neutralization reaction can be completed satisfactorily.

Other means for carrying out the reaction and other wetting agents or penetrants than those mentioned can be used. The concentration of the wetting agent or penetrant can vary widely depending upon the particular material used. On the average concentrations of from 0.35% to 2.0% include the optimum range.

The present invention is limited solely by the claims attached hereto as part of the present specification.

What is claimed is:

1. The method of preparing a free biguanide which comprises reacting an alkali metal hydroxide with an inorganic salt of a biguanide in the presence of a wetting agent consisting of an alkali metal salt of a product selected from the group consisting of alkylated aromatic hydrocarbon sulfonates, alkylated phenol sulfonates, higher alkyl sulfates, dialkyl esters of sulfosuccinic acid, sulfonated ethers, sulfated ethers, N-acyl taurines, sulfonated pine oil, sulfonated vegetable oil and sulfonated petroleum oil.

2. The method of preparing a free biguanide which comprises reacting an alkali metal hydroxide with an aqueous solution of an inorganic salt of an aryl biguanide at a temperature of at least 50° C. and in the presence of a wetting agent consisting of an alkali metal salt of a product selected from the group consisting of alkylated aromatic hydrocarbon sulfonates, alkylated phenol sulfonates, higher alkyl sulfates, dialkyl esters of sulfosuccinic acid, sulfonated ethers, sulfated ethers, N-acyl taurines, sulfonated pine oil, sulfonated vegetable oil and sulfonated petroleum oil.

3. The method of preparing a free biguanide which comprises reacting an alkali metal hydroxide with an inorganic salt of a biguanide at a temperature of at least 50° C. in an aqueous solution of alkyl benzene sodium sulfonate of at least 0.35% strength by weight.

4. The method of preparing a free biguanide which comprises reacting an alkali metal hydroxide with an inorganic salt of biphenyl biguanide at a temperature of at least 50° C. and in the presence of a wetting agent consisting of an alkali metal salt of a product selected from the group consisting of alkylated aromatic hydrocarbon sulfonates, alkylated phenol sulfonates, higher alkyl sulfates, dialkyl esters of sulfosuccinic acid, sulfonated ethers, sulfated ethers, N-acyl taurines, sulfonated pine oil, sulfonated vegetable oil and sulfonated petroleum oil.

5. The method of preparing a free biguanide which comprises reacting an alkali metal hydroxide with an inorganic salt of o-biphenyl biguanide at a temperature of at least 50° C. and in aqueous solution of a wetting agent of 0.35% to 2.0% strength by weight consisting of an alkali metal salt of a product selected from the group consisting of alkylated aromatic hydrocarbon sulfonates, alkylated phenol sulfonates, higher alkyl sulfates, dialkyl esters of sulfosuccinic acid, sulfonated ethers, sulfated ethers, N-acyl taurines, sulfonated pine oil, sulfonated vegetable oil and sulfonated petroleum oil.

JOSEPH R. INGRAM.